H. A. MASAC.
TIME GAUGE FOR PHOTOGRAPHIC DEVELOPING, ETC.
APPLICATION FILED APR. 7, 1920.
1,421,275. Patented June 27, 1922.
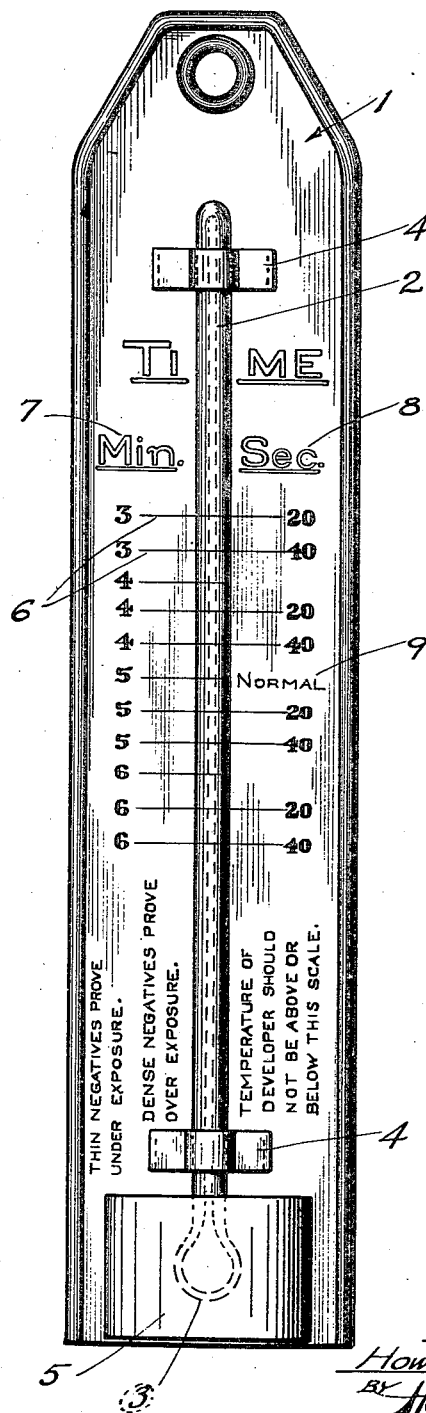

UNITED STATES PATENT OFFICE.

HOWARD A. MASAC, OF LOS ANGELES, CALIFORNIA.

TIME GAUGE FOR PHOTOGRAPHIC DEVELOPING, ETC.

1,421,275.     Specification of Letters Patent.    Patented June 27, 1922.

Application filed April 7, 1920. Serial No. 371,979.

*To all whom it may concern:*

Be it known that I, HOWARD A. MASAC, a citizen of the United States, residing at Los Angeles, in the county of Los Angeles and State of California, have invented new and useful Improvements in Time Gauges for Photographic Developing, Etc., of which the following is a specification.

This invention is a time gauge for photographic developing and the like, and has for its object to provide means for measuring the temperature of a developing solution in terms of the length of time which a plate should be left in said solution for the proper developing thereof.

The invention will be found to be particularly adaptable for use in developing X-ray plates, and in the present embodiment of the invention I have shown the graduations of the gauge arranged with particular reference to the developing of X-ray plates, although it will be readily understood that the invention is applicable to the development of any photographic plates and the like, the graduations upon the gauge, if necessary, being altered for the particular use for which the gauge is adapted.

The drawing, forming a part of this specification, is a front elevation of a gauge constructed in accordance with the invention.

The gauge is illustrated as comprising a base 1 upon which is mounted a closed tube 2 terminating at its lower end in a bulb 3, the tube being positioned lengthwise of the base 1 by suitable brackets 4 and, preferably, being provided with a protecting casing 5 over the bulb 3. The tube and bulb are adapted to contain any suitable medium which is expansible proportional to temperature variations, such as mercury, for example.

Graduations are provided upon the base of the gauge along the tube 2, these graduations being adapted to indicate in terms of periods of time various temperatures indicated by the column of the expansible medium within the tube 2. In the present instance, and as illustrating a practical embodiment of the invention, the graduations shown at 6 may each be arranged to indicate a rise in temperature of one degree F, eleven of such graduations being, preferably, provided forming ten spaces so positioned as to indicate temperature changes from 60° to 70° F.

Each of these graduations is marked to represent a period of time comprising 20 seconds between adjacent graduations, the indications for this period of time starting at 3 minutes and 20 seconds for the uppermost graduation which represents a temperature of 70° and extending downwardly therefrom to the lowermost graduation representing 6 minutes and 40 seconds. The minutes represented by the graduations 6 are, preferably, marked upon the base of the gauge at said graduations at one side of the tube 2, and the seconds indicated by the graduation are, preferably, marked upon the base of the gauge at the opposite side of the tube 2.

Above the numerals representing the minute graduations the word "Minutes" or an abbreviation thereof is, preferably, marked upon the base of the gauge as shown at 7, and similarly the word "Seconds" or an abbreviation thereof is marked upon the base of the gauge as shown at 8 above the numerals representing the second graduations. The middle graduation of the series indicating a temperature of 65° F. and marked to indicate 5 minutes is, preferably, also marked with the word "Normal" as shown at 9.

In use the gauge, as thus constructed, is adapted to be inserted in a developing solution which is to be employed for developing photographic plates, in the present instance X-ray plates. The temperature of the solution should always be between 60° and 70° F. inclusive and will therefore be registered on the gauge, and the length of time which a plate should be left in the developing solution will be indicated by the rising column of mercury upon the graduations of the gauge; the length of time which a plate should be left in the developing solution increasing conversely to the temperature of the solution from a period of time of 3 minutes and 20 seconds for a solution at a temperature of 70° F. to a period of time of 6 minutes and 40 seconds for a solution at a temperature of 60° F. Thus it will be seen that the proper length of time for developing a plate will be instantly shown upon the gauge when the latter is dipped in the developing solution without necessitating any computations.

Various changes may be made without departing from the spirit of the invention as claimed.

What is claimed is:

A gauge comprising a temperature responsive medium having a scale associated therewith and graduated from six minutes forty seconds to three minutes twenty seconds throughout what corresponds to a temperature increase from sixty degrees to seventy degrees F. inclusive.

In testimony whereof I have signed my name to this specification .

HOWARD A. MASAC.